United States Patent [19]

Jenkins

[11] Patent Number: 4,725,956
[45] Date of Patent: Feb. 16, 1988

[54] VOICE COMMAND AIR VEHICLE CONTROL SYSTEM

[75] Inventor: Michael W. M. Jenkins, Marietta, Ga.

[73] Assignee: Lockheed Corporation, Calabasas, Calif.

[21] Appl. No.: 787,584

[22] Filed: Oct. 15, 1985

[51] Int. Cl.[4] .............................................. G06F 15/50
[52] U.S. Cl. ..................................... 364/434; 364/424; 381/110; 244/190
[58] Field of Search ................... 364/424, 434; 381/42, 381/43, 110, 124; 244/1 R, 3.11, 76 R, 164, 189, 190

[56] References Cited

U.S. PATENT DOCUMENTS

| | | | |
|---|---|---|---|
| 3,179,355 | 4/1965 | Pickering et al. | 244/190 |
| 3,586,261 | 6/1971 | Paine | 244/164 |
| 3,957,230 | 5/1976 | Boucher et al. | 244/190 |
| 4,462,080 | 7/1984 | Johnstone et al. | 381/110 |
| 4,593,403 | 6/1986 | Kishi et al. | 381/43 |

Primary Examiner—Gary Chin
Attorney, Agent, or Firm—Eric R. Katz

[57] ABSTRACT

A voice command air vehicle control system for use by an operator with a remotely piloted vehicle utilizes a voice recognizer for converting spoken commands into machine compatible control signals which are transmitted to the vehicle. Also disclosed is the selection of particular verbal commands for use with the voice recognizer which increase the acceptance probability of the spoken command by the system.

1 Claim, 8 Drawing Figures

VOICE COMMAND AIR VEHICLE CONTROL SYSTEM

TECHNICAL FIELD

This invention generally relates to a system for controlling remotely piloted vehicles (RPV), and more particularly, to such a system which is controlled by voice commands.

BACKGROUND ART

The low-cost acquisition and demonstration, in flight, of new technologies appropriate to aircraft design are continuing research and development challenges. The multi-discipline nature of modern aircraft design demands not only the advancement of both the individual and the integrated technologies in the areas of aerodynamics, structures, and flight controls, but also an early flight-test demonstration of these technologies.

One such example of an innovative program is the Highly Maneuverable Aircraft Technologies Program or HiMAT. HiMAT has been developed as a research tool for testing new aircraft ideas rather than as a prototype for the building of a real aircraft. HiMAT uses a fly-by-wire method of control; however, the pilot is located on the ground and operates a device similar to a cockpit simulator to control the aircraft in a remote-control fashion. Such remotely piloted research vehicles (RPPV's) promise to play a larger role in the future in that they are an economic and safe method of flight testing.

Remotely Piloted Vehicles (RPV's) are also fulfilling an increasingly important role in applications to military missions including acquiring real-time targeting and battlefield surveillance data. Known RPV systems, like the abovedescribed RPRV system, utilize ground based control cockpits provided with typical aircraft control means such as a control stick, rudder pedals, throttle levers, and the like, so as to mimic an actual cockpit set-up. The ground control station remotely directs the RPV via a data link, for example, radio wave transmissions, wherein commands are relayed from the ground to an on-board RPV computer. The on-board computer controls the vehicle in accordance with the commands sent from the ground and relays vehicle performance data to the pilot on the ground which is then used to make the proper adjustments.

Operationally, the known systems for the remote piloting of an aircraft are quite efficient; however, drawbacks do exist. The ground based portion of RPV systems are typically large in size and difficult to transport to remote locations. Additionally, these described systems are expensive to manufacture.

Moreover, in order to operate the ground based control cockpit, extensive training in pilot techniques is needed in order to acquire the skills necessary to handle the extreme difficulties encountered in flying an RPV. This requirement is a costly and time-consuming procedure to satisfy.

DISCLOSURE OF THE INVENTION

It is, therefore, an object of the present invention to provide a control system for a remotely piloted vehicle, which is relatively lightweight and compact so as to be easily transported to a remote location.

Another object of the present invention is to provide a control system for a remotely piloted vehicle which is configured so as to eliminate the necessity for extensive training of the operator in pilot techniques in order to acquire the skills needed to fly a remotely piloted vehicle.

Yet another object of the present invention is to provide a control system for a remotely piloted vehicle which is relatively inexpensive to manufacture.

An important feature of the present invention is the provision of a totally new approach to controlling a remotely piloted vehicle such function now being accomplished in the art by means of a remote control cockpit having conventional input controls. In accordance with the present invention, a voice recognizer is employed for recognizing voice commands of an operator and for generating machine compatible control signals in accordance with those commands.

Another important feature of the present invention is the selection of particular verbal commands for use with the voice recognizer which increase the acceptance probability of the spoken command by the system of the present invention.

In accordance with these and other features, advantages, and objects of the present invention, there is provided a voice command air vehicle control system for use by an operator with a remotely piloted vehicle having control surfaces and a settable throttle. The system utilizes a voice recognizer for recognizing voice commands issued by the operator and for generating signals in accordance with those spoken commands. A microcomputer, connected to the voice recognizer, receives the signals generated by the voice recognizer, interprets those signals, and generates control signals suitable for transmission to the remotely piloted vehicle. An autopilot, located on the remotely piloted vehicle, receives the control signals and controls the pitch, yaw, and roll rate as well as the throttle setting in accordance with the transmitted control signals. Aircraft flight data, gathered by an array of aircraft motion, is transmitted to a flight data display for viewing by the operator.

BEST MODE FOR CARRYING OUT THE INVENTION

Figure 1:
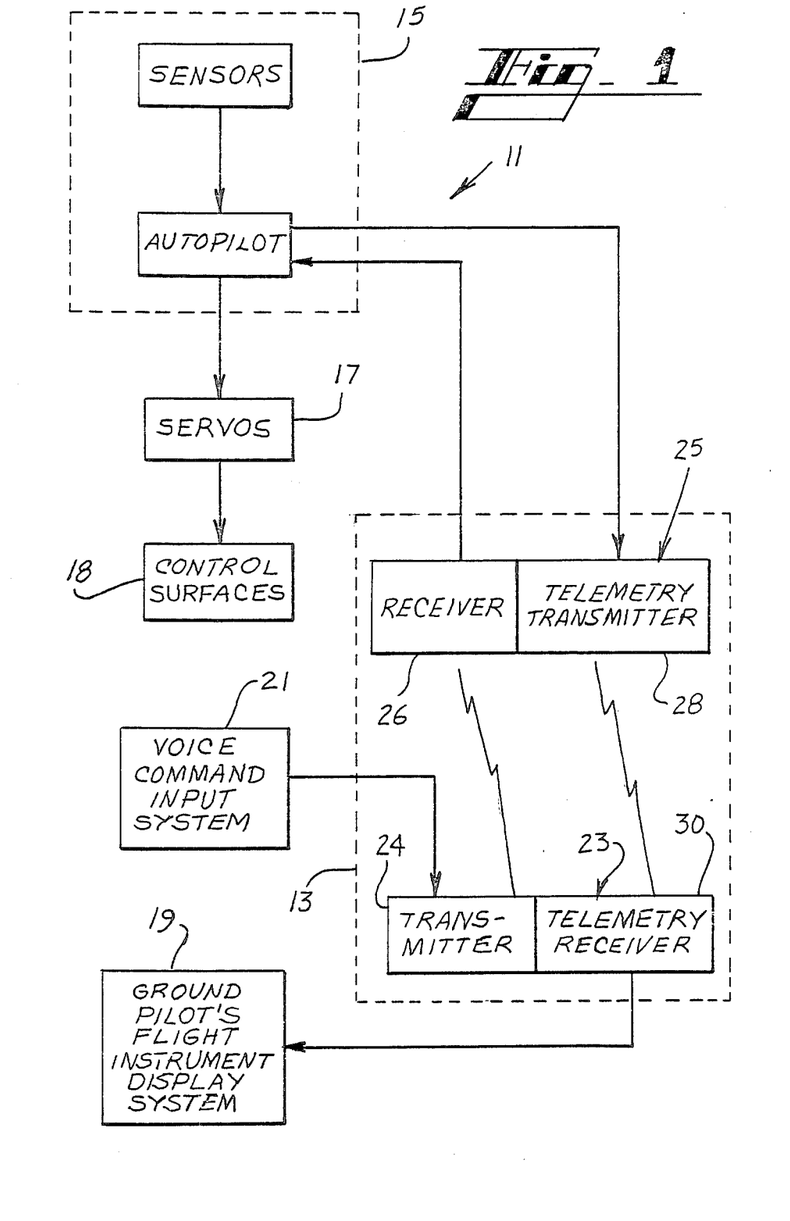
FIG. 1 is a block diagram illustrating the component parts of the voice command air vehicle control system of the present invention.

Referring to FIG. 1, a block diagram of a RPV control system, generally indicated at 11, is shown in accordance with the present invention. The system 11 includes a telemetry/control system 13, an autopilot and associated sensors 15, an aircraft electromechanical flight control servo system 17 for positioning control surfaces 18, a ground pilot's flight instrument display system 19, and a voice command input system 21.

Figure 2A:
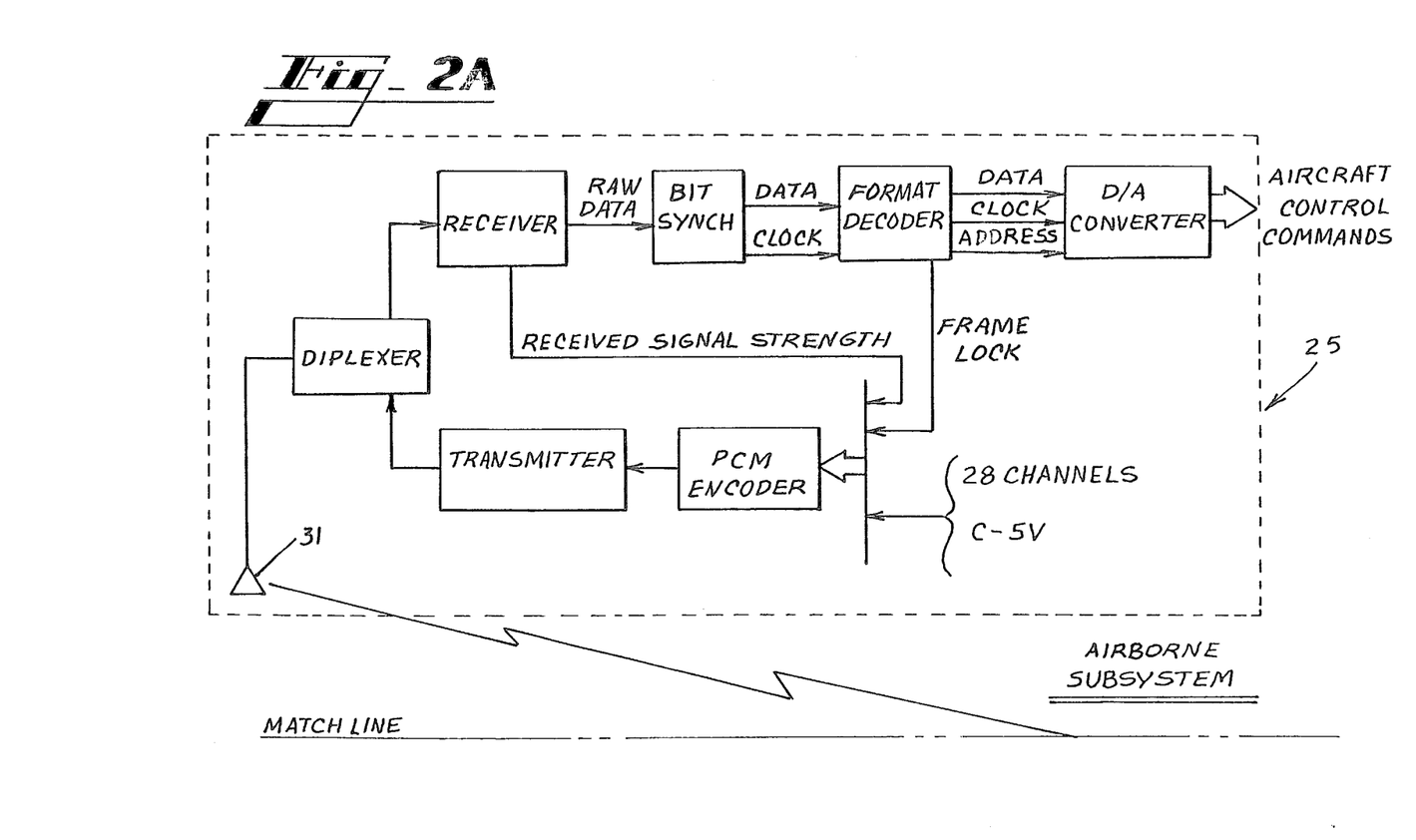
FIGS. 2A-2B are block diagrams illustrating the telemetry control system of the present invention.
Figure 2B:
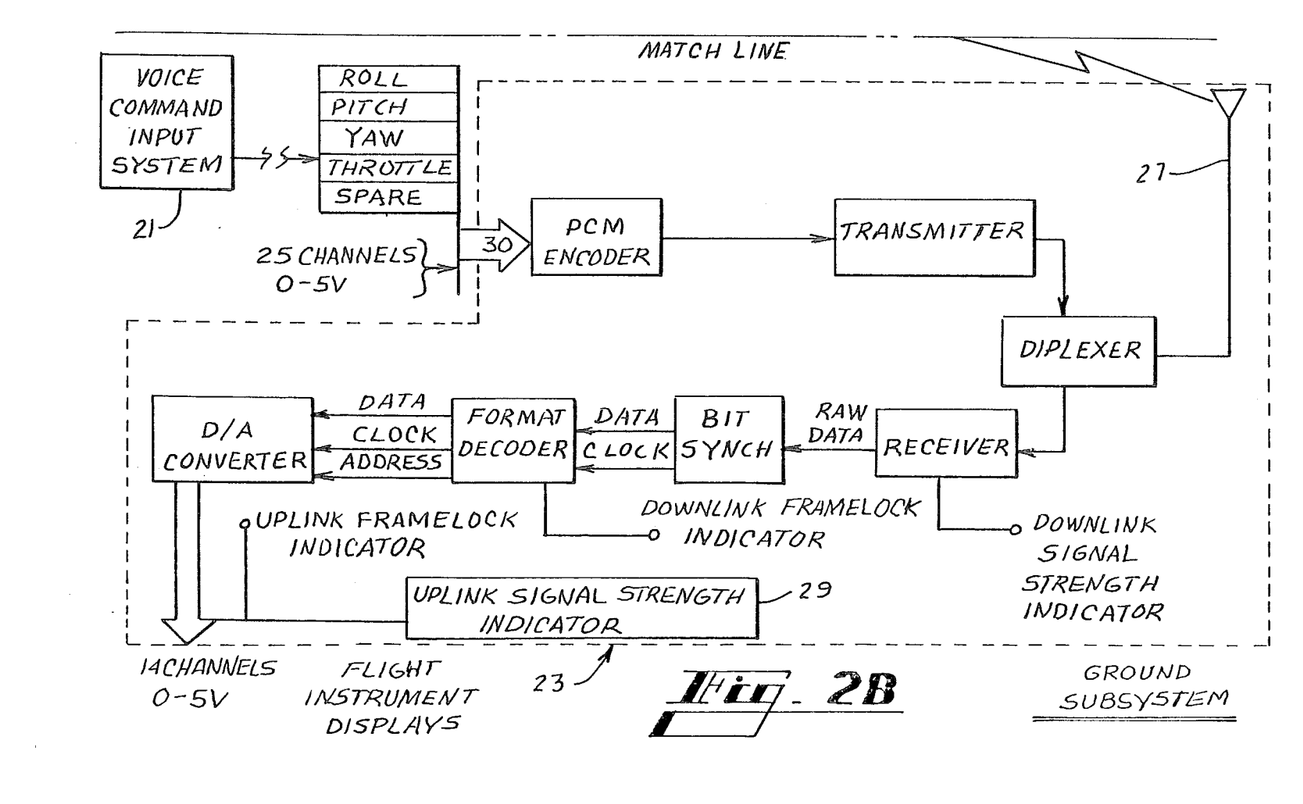

The telemetry/control system 13 comprises both a ground subsystem, generally indicated at 23, and an airborne subsystem, generally indicated at 25, as shown in FIGS. 1 and 2. The ground subsystem 23 receives control commands from the voice command input system 21, these commands being transmitted by transmitter 24 to the RPV and received by receiver 26. Telemetry data generated by the autopilot 15 are transmitted by telemetry transmitter 28 to the ground subsystem 23 and received by telemetry receiver 30, the received data being displayed by the ground pilot's flight instrument display system.

Referring to FIG. 2, block diagrams of each subsystem 23 and 25 are illustrated, the entire telemetry/control system 13 being available from AACOM Division of Datum, Incorporated, located at Concord, California; these block diagrams being considered by Applicant as self-explanatory.

Steering of ground antenna 27 is accomplished manually by observing the signal strength meter 29 and directing the antenna 27 to maintain maximum signal strength indication via the use of a CDE Ham 4 antenna rotator made by Cornell Dubler. Antenna elevation is typically fixed at about 10 degrees above the horizontal. The ground antenna 27 is typically circularly polarized with a 30-degree, 3 db beam width. An aircraft antenna 31 is an omnidirectional blade, Model Number 101002B manufactured by Tecan. System accuracy is better than ±0.4 percent of full scale.

Figure 3:
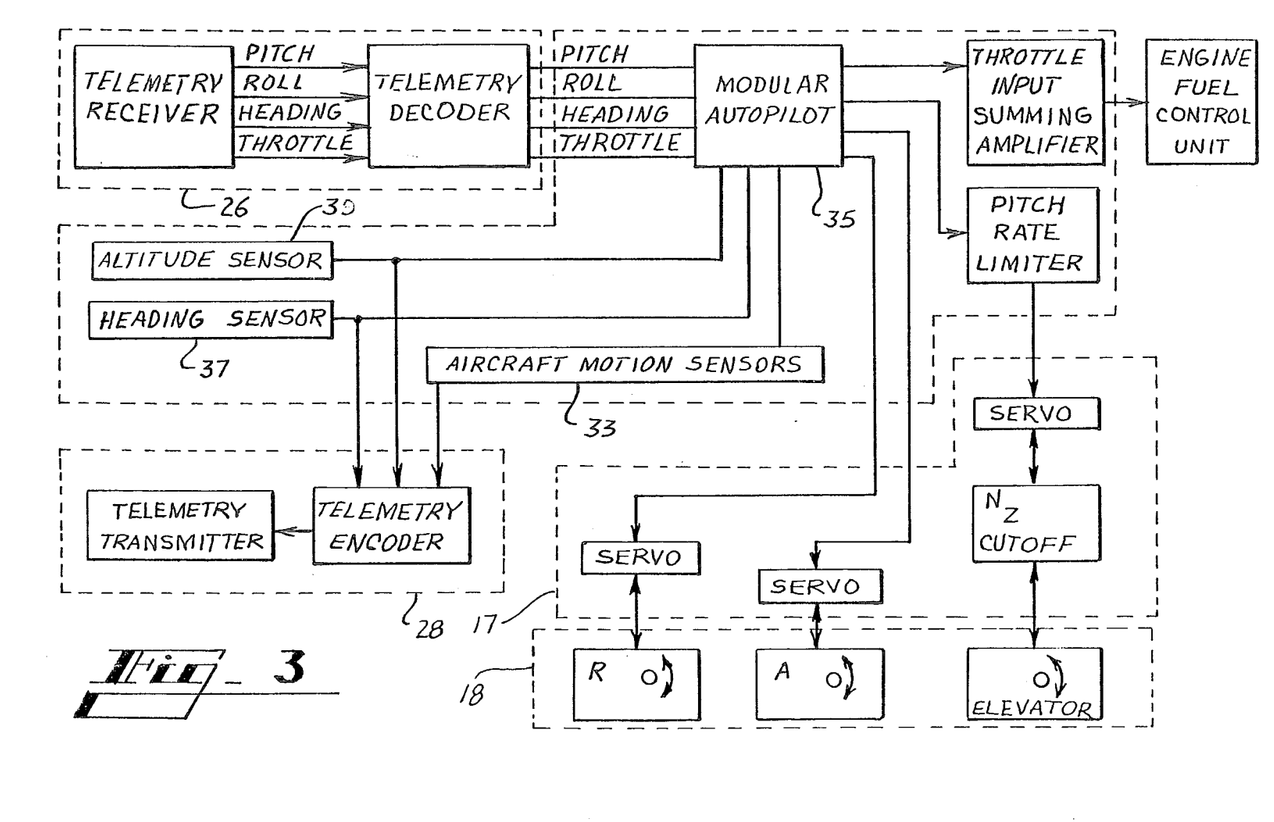
FIG. 3 is a block diagram of the autopilot and associated sensors of the present invention.

The autopilot system 15 illustrated by the block diagram of FIG. 3 is produced by KBG Corporation of Medway, Ohio. The system 15 is configured to accept roll, pitch, and yaw rate commands as well as throttle commands. Further, the system 15 also provides airspeed, vertical speed, attitude, turn and slip, altitude, and power data for transmission to the ground subsystem 23 and for display by ground pilot's flight instrument display system 19.

The autopilot system 15 comprises an array of aircraft motor sensors 33 including a 3-axis angular rate sensor and a vertical gyro. Inputs from the sensors 33 are provided to a modular autopilot 35, which also receives command inputs via telemetry receiver 26 as well as heading and altitude data from heading sensor 37 and altitude sensor 39, respectively. Data from aircraft motion sensors 33, heading sensor 37 and altitude sensor 39 are transmitted to the ground substation 23 via telemetry transmitter 28.

The modular autopilot 35 positions control surfaces 18 in accordance with commands received from the voice command input system 21 utilizing servos 17, one servo 17 being provided for each control surface 18. Each servo 17 includes an actuator, an amplifier, and an oscillator which converts 28 VDC into 400 Hertz AC for use by an AC induction motor. Servo control is affected by a ±5.0-volt input signal that produces ±25.0 degrees at the rotary output shaft. The motor drives the output through a 702:1 gear ratio. Servo bandwidth is about 4.0 Hertz at ±1.0 degree output displacement.

Figure 4:
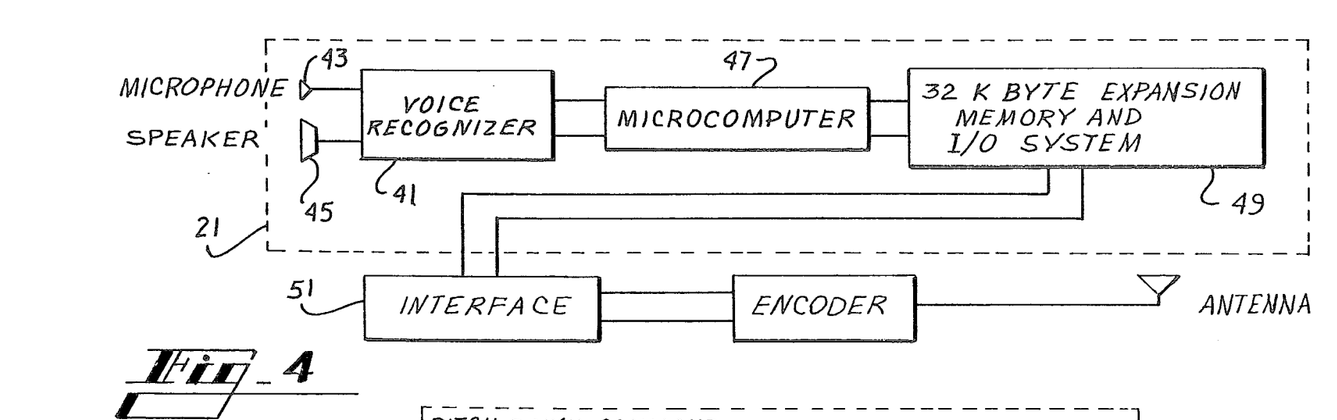
FIG. 4 is a block diagram of the voice command input system of the present invention.

Referring to FIG. 4, a block diagram illustrates the voice command input system 21 which comprises a voice recognizer 41, having a microphone 43, and speaker 45. A microcomputer 47 with a 32K memory expansion and input/output system 49 controls the operation of the voice recognizer 41 and provides the storage necessary to operate the voice recognizer 41.

Interface means 51 provides the means for inputting the voice commands received by voice recognizer 41 into the RPV control system 11. The microcomputer 47 translates a given recognized voice input into a voltage level that controls a solid state switch in the interface means 51. The solid state switch closes on command and inputs a preset voltage level into the particular command channel being addressed. The preset control voltage is telemetered to the aircraft where it activates a particular servo that drives the selected control surface or throttle setting.

Figure 5:
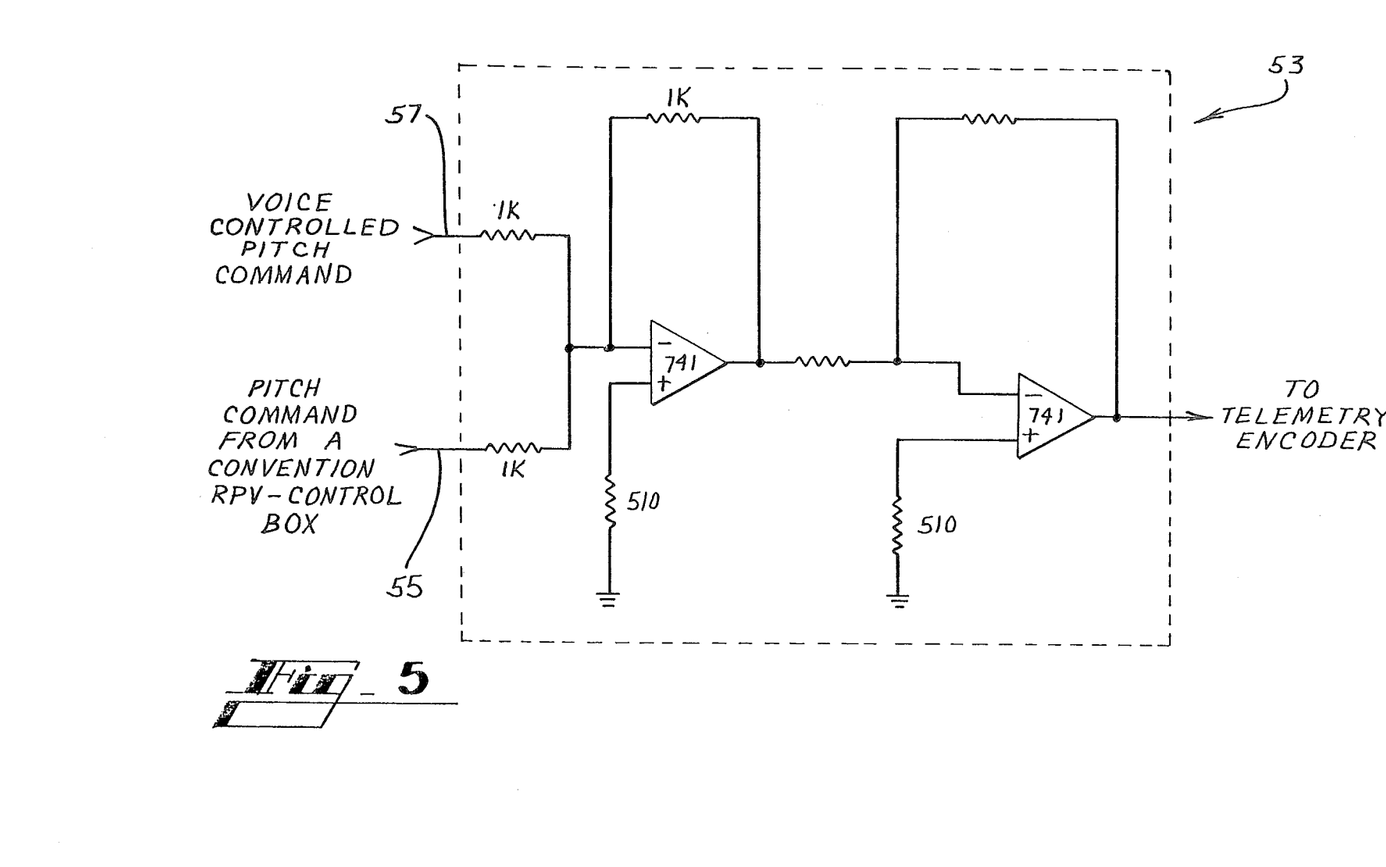
FIG. 5 is a schematic diagram of a pitch summing amplifier utilized by the interface means of the present invention.

The interface means 57 includes an individual summing amplifier, generally indicated at 53 in FIG. 5, for each of the four control parameters that are telemetered to the aircraft, the control parameters comprise: pitch, yaw, roll and throttle. The output of a conventional RPV control arrangement may be inputted to the summing amplifier 53, for example, on line 55, as shown in FIG. 5, with the output of the voice recognizer 41 being brought to the summing amplifier 53 on line 57. This provides a redundant system, if required; however, the voice recognizer 41 is sufficient to operate the sytem of the present invention.

Figure 6:
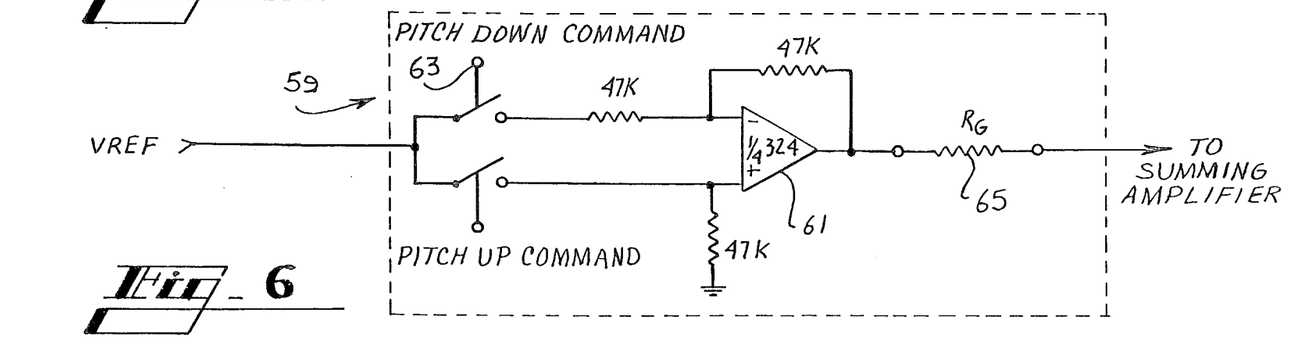
FIG. 6 is a schematic diagram of a switching circuit utilized to conduct voice controlled commands to the summing amplifier.

Referring to FIG. 6, an example of a switching circuit, generally indicated at 59, is shown, the switching circuit being employed to bring voice controlled commands to summing amplifier 53.

The output of switching circuit 59 is designed to be zero when no control signal is commanded from voice recognizer 41. If no voice command is present, the output of amplifier 61 is zero volts since the only input to the amplifier 61 is the ground on the positive terminal of amplifier 61.

When the voice recognizer 41 is activated and a pitch-down command, for example, is given and accepted, switch 63 closes and a reference voltage is passed through amplifier 61, inverted, and presented to resistor 65, a gain resistor, the strength of the command to be telemetered to the aircraft is determined. The command persists until the command is given to "stop" the pitch-down maneuver, at which time the switch opens and the system reverts to the condition of no command which is: "aircraft trimmed to level flight".

The above-described interface arrangement is simple, reliable, and effective. The voltages controlling the switches shown in FIG. 6 are normal Transistor, Transistor Logic (TTL) voltage levels provided by the voice command input system 21 as will be described below.

The voice command input system 21 comprises the voice recognizer 41 and mircocomputer with memory 47. The voice recognizer 41 may comprise a Cognivox VIO-1001 speech recognition and voice output device as manufactured by Voicetek, P.O. Box 388, Goleta, CA 93116. The microcomputer may comprise an expanded AIM-65 microcomputer system as made available by Rockwell International - Micro Electronic Devices, P.O. Box 2669, Anaheim, Calif. 92803.

The Cognivox system utilizes the principle of feature extracting in its voice recognition function, feature extraction being the process of extracting a set of slowly varying parameters that represent a word. Voice response in the Cognivox is achieved using a waveform recording technique which offers a good quality and ease of use at moderate data rates. The user can choose his vocabulary and is not contained to a prechosen set of words furnished by a manufacturer.

The Rockwell AIM-65 is a complete general purpose microcomputer with the BASIC programming language available as applications software. The AIM-65 comprises two modules: the master module and the keyboard module, these two modules being connected by a plug-in ribbon cable. The master module is made up of a printer, a display, and the microcomputer components. The Cognivox application of the AIM-65 requires a minimum of 16K bytes of memory, but a basic AIM-65 has only 4K bytes of available space so that a memory-mate 32 byte memory expansion board is added.

The memory-mate expansion board is sold complete with 32 bytes of dynamic random-access, read-write memory with on-board refresh circuitry. The memory-mate is also equipped with 4-8 bit programmable input-/output ports. One of the ports is employed in the present invention to drive the electronic switch that controls the application of the commands. The memory-mate expansion board is manufactured and sold by Forethought Products, 82070 Dukhodan Road, Eugene, OR 97402.

The Cognivox voice recognition unit, Table II, is supplied with software for its operation and testing. The driver program is supplied in machine language and is called VOX 3. The other software is provided in the BASIC programming language. The principal program of these programs written in BASIC is PROG. 3. PROG 3 is used to train Cognivox to vocabulary it is to recognize and to store the Cognivox response vocabulary. The most difficult part of training the recognizer is vocabulary selection. Vocabulary selection will be discussed in more detail below.

Voicetek supplies the driver program VOX 3 in machine code. VOX 3 includes routines that perform the functions listed in Table I. The program VOX 3 also returns error codes to the calling software. These error codes indicate the status of the requested function. The status codes are given in Table III. VOX 3 is an absolute program and will operate only if it is loaded into memory at a specific starting address (1200 hexadecimal). There are several reserved memory locations associated with the use of VOX 3, these are given in Table IV. Cognivox is supplied with a sample program that allows all functions of Cognivox to be tested. This program is called PROG 3. It was observed early on that the recognition training and the response vocabulary stored under PROG 3 placed the data in reserved memory areas. It was also noted that regardless of what application program generated the recognition and response vocabularies they are always stored in the same reserved memory area. Since the memory used in this system is all read/write memory which is volatile, the data stored is lost each time the machine is turned off. For this reason, the VOX 3 driver program and the response and recognition vocabularies were stored on a magnetic tape cassette for later use: however, an EPROM or ROM could be used to store programming and is preferred. Using PROG 3 as a vehicle for storing the recognition and response vocabularies greatly reduced the amount of programming time required.

Great care is required in selecting vocabulary because if two words have features that are close the recognizer may not choose the correct word from its recognition vocabulary. PROG 3 has a word recognition/response program that is used in evaluating various recognition vocabularies. The principal criterion is that control words not be confused by the recognizer. For example, the first choices for the pitch maneuvers are pitch up and pitch down. A lengthy evaluation of the vocabulary reveals that these are confused with each other and with other control words. It is also noted that the state of the operator has a bearing on recognition efficiency, i.e., a vocabulary that looks relatively good under most circumstances falls apart if the operator is fatigued. The testing of the vocabulary thus includes a fatigue test to assure reliable operation under all conditions.

The vocabulary finally chosen and evaluated is found to be 95% effective or better under normal conditions and about 90% effective under fatigue conditions. One criterion that is imposed on the command vocabulary is that the words relate to the commanded maneuver in a meaningful way. The vocabulary and the corresponding commands are given in Table V. If an unrelated vocabulary is used, the accuracy could reach 98% or higher. A preferred embodiment for giving the commands is either a control van with acoustic padding or a control tower. A different and simpler vocabulary without direct relationship to the maneuvers would likely be more effective.

TABLE I

| VOX 3 FUNCTIONS | |
|---|---|
| Routine | Function |
| Cold Start | Routine initializes all input-output ports and reserved memory locations. |
| Set Response | This routine sets all pointers needed for response function of cognivox. |
| Speaker Adaptation Pass I - | This routine prompts speaker and takes in first set of recognition data. |
| Process Speaker Adaptation Data | Extract features of data and store in memory. |
| Play Back a Word | Routine selects a word from response vocabulary and plays it back. |
| Recognizes a Word | Routine takes in a word from speaker, processes it, and compares it to data in recognition vocabulary. |
| Enter Recognition Vocabulary | Store process vocabulary in memory. |
| Enter Response Vocabulary | Store response vocabulary for later playback. |
| Individual Word Retraining | Allows operator to update a particular word in the recognition vocabulary. |

TABLE II

| COGNIVOX SPECIFICATIONS | |
|---|---|
| Recognizer Type | Isolated word, speaker dependant. |
| Type of Voice Output | Digital recording of user voice, using a data compression algorithm. |
| Vocabulary Size | 32 words or short phrases for both recognition and voice response. |
| Dialog Capability | Recognition and response vocabularies can be different. |
| Word Duration for Recognition | Maximum duration depends on amount of available memory for response storage. |
| Silence Gap between Words | 150 ms minimum. |
| Training Required | Must pronounce vocabulary 3 times to train recognizer. Allows words to be individually retrained. |
| Recognition Accuracy | Up to 98%. Recognition accuracy depends on speaker experience and choice of vocabulary. |
| Audio Output | 150 mW |
| Frequency Response | 100 to 3200 Hz. |
| Power Consumption | 150 mW during recognition, 450 mW maximum during speech output. |
| Dimensions | 5" × 6" × 1.25" |
| Memory Requirements | Approximately 4K bytes for program and tables. 1.5K bytes per sec of speech |

TABLE II-continued

COGNIVOX SPECIFICATIONS for storage of voice response vocabulary.

TABLE III

VOX 3 STATUS CODES

| Status Code | Meaning |
|---|---|
| 00 | No error detected. |
| 01 | Subroutine called more times than maximum number of words allowed in vocabulary. |
| 02 | Speech buffer overflow; use shorter enunciations. |
| 03 | Enough data collected for speaker adaptation |
| 04 | Response storage overflow; use fewer or shorter words. |

TABLE IV

VOX 3 RESERVED MEMORY LOCATIONS

| Hexadecimal Memory Location | Name | Function |
|---|---|---|
| 1223 | VF | Function code storage |
| 1796 | VR | Recognized word storage |
| 1797 | VE | Error code storage |
| 1794 | VW | Number of recognition words |
| 1795 | VX | Number of response words |
| 0012 | VV | Address of 256 byte segment where all VOX 3 entry points are stored. |

TABLE V

VOICE RECOGNITION VOCABULARY

| Recognized Word | Command | Comment |
|---|---|---|
| (1) Caproni | None | Code word - otherwise no command |
| (2) Left | Yaw Left | None |
| (3) Yaw Right | Yaw Right | None |
| (4) Port | Roll Left | None |
| (5) Rollstarboard | Roll Right | None |
| (6) Pitchup | Pitch up | None |
| (7) Descend | Pitch down | None |
| (8) Faster | Increase throttle | None |
| (9) Slowdown | Decrease throttle | None |
| (10) Stop | None | Release command |

TABLE VI

RESPONSE VOCABULARY

| Recognized Word | Response Word |
|---|---|
| Caproni | Listening |
| Left | Yawing Left |
| Yaw Right | Yawing Right |
| Port | Rolling Left |
| Rollstarboard | Rolling Right |
| Pitchup | Pitching Up |
| Descend | Pitching Down |
| Faster | Going Faster |
| Slowdown | Going Slower |
| Stop | Stopping |

A response vocabulary was also selected and is presented in Table VI along with the recognized word which triggers a given response.

Figure 7:
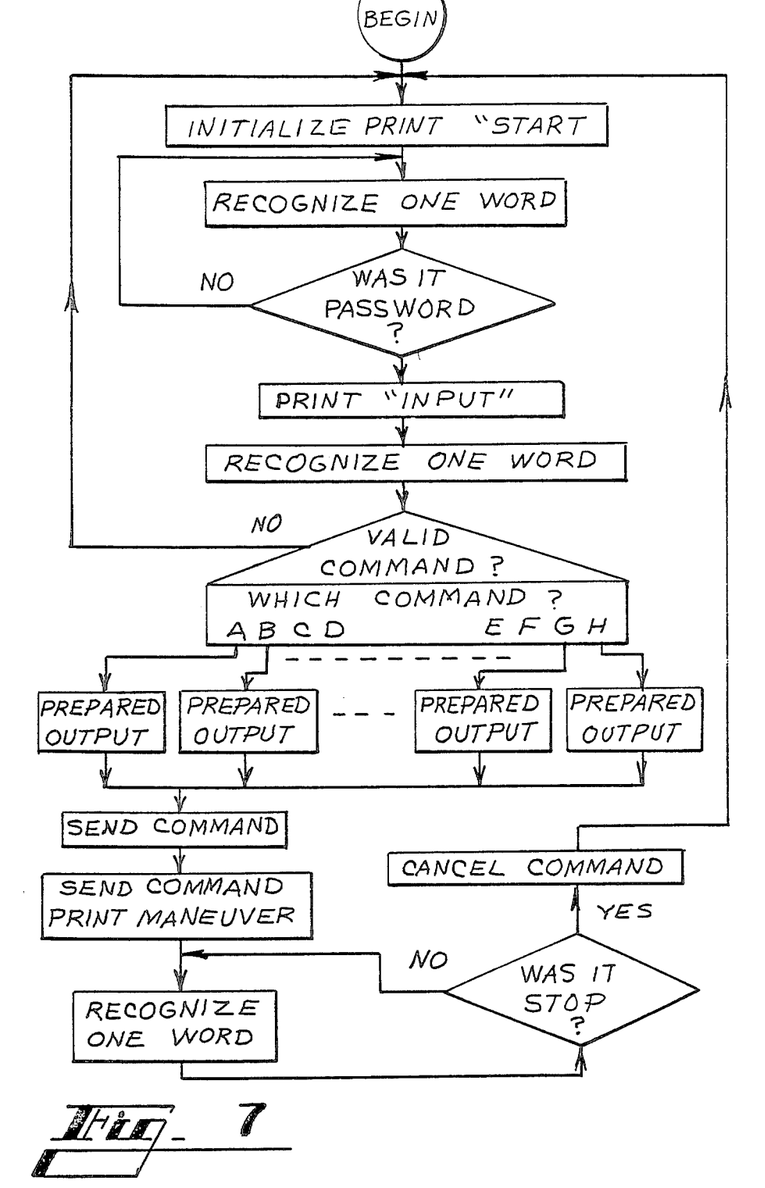
FIG. 7 is a block diagram of the operation of the voice command air vehicle control system of the present invention.

The flow chart for the control program is shown in FIG. 7. Once the program is started it operates continuously until the operator resets the computer or power is lost. When the program is started it initializes all I/O ports and reserve memory locations and then prints "start" on the AIM-65 display. At this point, the system is ready for voice input as can be seen in FIG. 7. The program (VOCN 3) waits for the code word Caproni before it will accept any command. When the operator addresses the system with the code word Caproni, VOCN 3 responds by printing "input" on the display of the AIM-65. At this time any of the commands can be spoken into the microphone. If the command is a valid one and if the program recognizes it, a command is immediately sent to the aircraft and VOCN 3 prints the maneuver on the AIM-65 display. The command will persist until the operator speaks the Stop command at which time the command to the aircraft is removed and the message "start" is printed on the AIM-65 display. The system is designed to allow only one command to be entered at a time and such that the given command must be terminated before a new command could be entered. The code word Caproni must be given and accepted before each command.

While the invention has been particularly shown and described with reference to preferred embodiments thereof, it will be understood by those skilled in the art that various changes in form and detail may be made therein without departing from the spirit and scope of the invention as defined by the appended claims.

What is claimed is:

1. A voice command air Vehicle control system for use by an operator with a remotely piloted vehicle having control surfaces and a throttle comprising:
   (a) a voice recognizer for recognizing voice commands issued by the operator and for generating signals in accordance with those commands;
   (b) a microcomputer connected to said voice recognizer for receiving the signals generated by said voice recognizer, for interpreting those signals, and for generating control signals suitable for transmission to the remotely piloted vehicle:
   (c) a transmitter for transmitting said control signals to the remotely piloted vehicle;
   (d) a receiver, located on said remotely piloted vehicle, for receiving said transmitted control signals;
   (e) an autopilot connected to said receiver for receiving said control signals and for controlling the pitch yaw, and roll rate of the remotely piloted vehicle as well as the throttle setting in accordance with the transmitted control signals;
   (f) an array of aircraft motion sensor for gathering aircraft flight data including the rate of change and orientation of the remotely piloted vehicle in 3-dimension space and for providing said aircraft flight data to said autopilot;
   (g) an aircraft electromechanical flight control servo means for positioning the control surfaces and throttle setting of the remotely piloted vehicle under the control of said autopilot and in accordance with said control signals;
   (h) a telemetry transmitter for transmitting remotely piloted vehicle flight data to the operator;
   (i) a telemetry receiver for receiving said remotely piloted vehicle flight data transmitted by said telemetry transmitter: and
   (j) a flight data display for displaying said transmitted flight data to the operator.

* * * * *